United States Patent
Kanbe et al.

(10) Patent No.: US 8,100,313 B2
(45) Date of Patent: Jan. 24, 2012

(54) SOURCE BLANK FOR STAINLESS STEEL THREE-PLY CLAD SHEET, PRODUCTION METHODS OF CLAD STEEL PLATE AND SHEET FOR SOLID POLYMER TYPE FUEL CELL SEPARATOR, AND SOLID POLYMER TYPE FUEL CELL SEPARATOR

(75) Inventors: Motomichi Kanbe, Osaka (JP); Kunihiko Ushio, Osaka (JP); Takeo Yazawa, Osaka (JP); Hideaki Yamamoto, Osaka (JP); Yoshio Tarutani, Osaka (JP); Akira Seki, Osaka (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 985 days.

(21) Appl. No.: 12/076,197

(22) Filed: Mar. 14, 2008

(65) Prior Publication Data

US 2008/0220308 A1     Sep. 11, 2008

Related U.S. Application Data

(63) Continuation of application No. PCT/JP2006/318275, filed on Sep. 14, 2006.

(30) Foreign Application Priority Data

Sep. 15, 2005  (JP) .................................. 2005-268376
Sep. 15, 2005  (JP) .................................. 2005-268712

(51) Int. Cl.
| | |
|---|---|
| A47J 36/02 | (2006.01) |
| B23K 31/02 | (2006.01) |
| B23K 26/00 | (2006.01) |
| B21D 39/00 | (2006.01) |
| B23K 20/16 | (2006.01) |
| B23K 35/36 | (2006.01) |
| B23K 15/00 | (2006.01) |
| H01M 8/22 | (2006.01) |

(52) U.S. Cl. ................... 228/101; 228/178; 228/262.41; 228/901; 228/159; 219/121.13; 219/121.14; 219/121.63; 219/121.64; 429/405; 429/406

(58) Field of Classification Search ........................ None
See application file for complete search history.

(56) References Cited

U.S. PATENT DOCUMENTS

| | | | |
|---|---|---|---|
| 3,795,042 A * | 3/1974 | Kreider et al. | 228/190 |
| 7,507,487 B2 | 3/2009 | Tajima et al. | |
| 2004/0258553 A1* | 12/2004 | Litvintsey et al. | 419/65 |
| 2005/0183796 A1* | 8/2005 | Ishida et al. | 148/524 |

(Continued)

FOREIGN PATENT DOCUMENTS

JP     60-203373     10/1985

(Continued)

*Primary Examiner* — Brian J Sines
*Assistant Examiner* — Jennifer Wecker
(74) *Attorney, Agent, or Firm* — Clark & Brody

(57) ABSTRACT

A method for producing a stainless steel three-ply clad sheet for a fuel cell separator comprises heating a source blank and then performing rough rolling, hot rolling and cold rolling thereto, whereby the clad steel sheet for the fuel cell separator or a solid polymer type fuel cell separator thereby is obtained. The source blank for the clad steel sheet is composed of a stainless steel utilizing 0 to 0.3% B as a core component and a stainless steel containing 0.3 to 2.5% B as face component. The source blank is made using face components, a core component, tabs and protectors and performing steps including bonding of the tabs and protectors to the face components, removing portions of the tabs and protectors, piling of the face components to the core component, and further bonding of the face and core components together to form the source blank.

8 Claims, 7 Drawing Sheets

U.S. PATENT DOCUMENTS

2008/0048007 A1* 2/2008 Chikaki ..................... 228/101
2008/0152984 A1* 6/2008 Nakanishi et al. ............. 429/31

FOREIGN PATENT DOCUMENTS

| | | |
|---|---|---|
| JP | 63-76703 | 4/1988 |
| JP | 04-253506 | 9/1992 |
| JP | 04-305384 | 10/1992 |
| JP | 06-246424 | 9/1994 |
| JP | 2001-239364 | 9/2001 |
| JP | 2004-071319 | 3/2004 |
| KR | 10-2005-0046752 | 5/2005 |
| TW | 496010 B | 7/2002 |

* cited by examiner $t_1 = t_{11} + t_{12}$ $t_1 = t_{11} + t_{12}$

SOURCE BLANK FOR STAINLESS STEEL THREE-PLY CLAD SHEET, PRODUCTION METHODS OF CLAD STEEL PLATE AND SHEET FOR SOLID POLYMER TYPE FUEL CELL SEPARATOR, AND SOLID POLYMER TYPE FUEL CELL SEPARATOR

This application is a continuation of International Patent Application No. PCT/JP2006/318275, filed Sep. 14, 2006. This PCT application was not in English as published under PCT Article 21(2).

TECHNICAL FIELD

The present invention relates to a method for producing a source blank for a stainless steel three-ply clad sheet, a method for producing a plate and a steel sheet for solid polymer type fuel cell separator using said source blank for the steel clad sheet, and a solid polymer type fuel cell separator and, more specifically, relates to said source blank for a stainless steel three-ply clad sheet, and each method for producing a plate and a steel sheet for use in a fuel cell separator, employing a boron (B)-containing steel for face components to abut on either face of a core component, and relates to a fuel cell separator.

BACKGROUND OF THE INVENTION

In recent years, a fuel cell has been attracting lots of attention as a future clean energy, particularly, amid mounting concern over Global warming prevention as part of global environment issues. The fuel cell is a battery which generates direct current electric power by using hydrogen and oxygen, and the fuel cell is exemplified by a solid electrolyte type fuel cell, a molten carbonate type fuel cell, a phosphoric acid type fuel cell, a solid polymer type fuel cell or the like.

The solid polymer type fuel cell is particularly expected on a global scale to be put into practical use as a dispersed power source for emergency in a small business office, a phone switching station or the like, a dispersed power source for household use using city gas as fuel, and a power source for low-emission electric vehicle using hydrogen gas, methanol or gasoline as fuel, because its is easy to start and stop with an operation temperature as low as about 80° C., and has potential for energy efficiency of about 40%.

Conventionally, as a separator material for solid polymer type fuel cell, application of carbon plate material has been investigated. However, the carbon plate material has the problem of an increased manufacturing cost due to the necessity for precise machining to flatten its surface or form a gas flow path as well as the problem of "high crack susceptibility". Each of these problems is inherent and renders the very commercialization of the fuel cell difficult.

To solve such problems, application of stainless steel as a separator material for a fuel cell has been attempted also with the primary objective of reducing the manufacturing cost, although this trend faces off against the above-mentioned investigation for application of graphite.

However, use of stainless steel in as-is condition as the separator material is improper since its surface is covered with a passivated film. As measures to this, it has been practiced, as an inexpensive method, to ensure conductivity by including boron in stainless steel and forming a number of projections of boride (boronized compound) on the surface, while gold plating on the surface of stainless steel could be applied.

However, including boron makes the stainless steel hard, and the resulting stainless steel may get cracked during rolling to hinder the rolling or extremely deteriorate the yield of product.

Japanese Patent Application Publication No. 06-246424 discloses, as a method for preventing cracking of B-containing steel in hot rolling from the viewpoint of production, a production method adapted to prevent edge cracking by bonding stainless steels of SUS 316 and SUS 317 to both surfaces of mild steel containing 1% or more boron and serving as a core layer member by means of cast clad.

Japanese Patent Application Publication No. 04-253506 discloses, as a hot rolling process for preventing edge cracking, a method comprising producing an assembled blank composed of an austenitic stainless steel containing 0.3 to 2.0 wt % of B and a steel smaller in flow stress (deformation resistance) than the stainless steel, the steel being welded to the stainless steel so as to cover side edge portions thereof, and finish-rolling the assembled blank at a temperature of $(53 \times B+700)°$ C. (B: content of B (wt %)) or higher.

Similarly, Japanese Patent Application Publication No. 2001-239364 proposes, for preventing edge cracking of a workpiece to be rolled, a hot working method comprising providing, in hot rolling of an austenitic stainless steel containing 0.3 to 2.5% by mass of B, a protective layer with a thickness of 3 mm or more by overlay weld composed of a stainless steel containing Ni: 4% or less and B: 0.1 to 0.4% on side end faces of the steel.

Japanese Patent Application Publication No. 2004-71319 proposes to bond, between a pair of steel products as corrosion-resistant separator material sheets where electrically conductive non-metallic inclusions are cropped out of the surfaces thereof and exposed to the air, a metallic material higher in ductility than the steel product, so that the superior mechanical property of causing no cracking in press forming in addition to excellent electric contact resistibility with an electrode assembly can be ensured, when a separator composed of such steel is in use.

DISCLOSURE OF THE INVENTION

In application of the above-mentioned clad stainless steel or the like to the fuel cell separator, some problems remain to be solved.

Namely, in the production method disclosed by Japanese Patent Application Publication No. 06-246424, since the core part and the face part are composed of B-containing mild steel and stainless steel, respectively, using cast clad steel as the starting material, a boundary region between the mild steel and the stainless steel is highly likely subjected to disbanding. Further, the clad steel disclosed in Patent Document 3 is poor in corrosion resistance because the core part is composed of mild steel, and a nonconductive film is further formed on a surface layer because the face part is composed of stainless steel free from B, whereby the clad steel cannot be used as a fuel cell separator.

In the hot rolling method disclosed in Japanese Patent Application Publication No. 04-253506, a frame having an accurate groove shape need to be prepared and further welded so as not to be disbanded at the time of hot working. Therefore, the welding requires a lot of welding time.

In the hot working method of Japanese Patent Application Publication No. 2001-239364, similarly, a sufficient weld-penetration thickness need to be ensured for preventing edge cracking during hot rolling, and the number of passes in welding needs to be increased for providing the protective layer by overlay weld, resulting in an increased welding time.

If weld cracking should occur, edge cracking can start from this point, and thus it becomes difficult to perfectly prevent the edge cracking.

The steel sheet for a separator disclosed in Japanese Patent Application Publication No. 2004-71319 relates to a three-ply clad steel sheet where a metal higher in ductility than a face layer part is clad therein as a core layer part as described above, and the greatest feature is that even if cracking should occur, an easily-propagating cracking can be prevented in press forming by virtue of cladding the metal higher in ductility than the face layer part as the core layer part. However, this feature is only one of generally added functions as functions of the clad. Further, Japanese Patent Application Publication No. 2001-239364 discloses nothing about an integration technique for making the stainless steel clad.

In view of the above-mentioned problems caused in the application of stainless steel to a fuel cell separator, the present invention thus provides a method for producing a source blank for a stainless steel three-ply clad sheet, the source blank containing an optimal B content as a solid polymer type fuel cell separator and being mass-producible at low costs, excellent in hot workability and formability. The present invention further provides methods for producing a plate and a steel sheet for use in the separator using the resultant blank, and further provides a separator and a solid polymer type fuel cell using the resultant plate and/or sheet.

The present inventors adapt the method of forming boride (boronized compound) excellent in electric conductivity for developing a stainless steel which is most suitable for the fuel cell separator. Namely, the boride is projected and directly crops out of the surface thereof without being covered with a passivated film on its surface and exposed to the air, whereby electric conductivity of the stainless steel surface can be lowly stabilized over a long time.

For ensuring the number of projections of the boride on the stainless steel surface, a B content in stainless steel needs to be set to 0.3% or more. However, when a stainless steel contains a large amount of B, generally, the stainless steel is enhanced in strength and hardness or deteriorated in ductility, causing deterioration of hot workability or formability.

When a stainless steel with a B content of less than 0.3% is selected, hot workability is improved, and flow stress in forming is minimized. The hot workability is generally controlled by the flow stress of the material. The flow stress of a clad steel sheet is determined by applying a law of mixture to flow stresses of respective clad components thereof. Accordingly, the hot workability can be significantly improved by cladding, on a stainless steel single body with a high B content and large flow stress, a stainless steel with a low B content and small flow stress.

The present inventors further made the earnest studies about a production method capable of providing a sound welded part without edge cracking during rolling in assembling of a blank for a three-ply clad stainless steel intended by the present invention. As a result, the following findings (a) to (d) are obtained.

(a) A sound welded part can be obtained while preventing weld metal dropping (hereinafter also referred to as "bead drop") in welding a source blank for stainless steel clad sheet, the welding being with high energy density, by setting the width and/or length of a core component larger than the total width and/or length where face components and protectors are combined, within a plane parallel to a working plane.

The "welding with high energy density" means welding with an energy density of $10^5$ W/cm$^2$ or more, and typical examples thereof include plasma welding, electron beam welding and laser welding.

Particularly, the electron beam welding has the advantage that the air between the core component and the face components can be perfectly eliminated since assembly welding is performed under vacuum, and disbonding therebetween in hot rolling or hot forging can be thus prevented.

(b) Bead drop and extension of a nonsteady state region of weld bead into a main body can be prevented with potential for ensuring of a stable bead shape and improvement in yield, by disposing, in bonding protectors to side end faces of the face components, the protectors each with a length greater than the length of the side end face of the face component onto the side end faces of the face components, and by disposing tabs, as described later, each in abutting relation with an extension of the protector's face to abut on the side end face of the face component, where the extension is an extra length portion exceeding the length of the side end face of the face component by starting the bonding from the boundary region between the tab and the protector.

(c) Further, edge cracking during rolling can be prevented by disposing, on side end faces of a piled block obtained by piling face components on the core component in a sandwiching manner, the protectors each with a thickness covering the whole thickness of the plied block and the above-mentioned length greater than the length of the side end faces thereof, by disposing tabs each in abutting relation with an extension of the protector's face to abut on the side end face of the piled block, where the extension is an extra length portion exceeding the length of the side end face of the piled block, and by integrating the block and other components by bonding to thereby obtain a source blank for a stainless steel three-ply clad sheet.

(d) A steel sheet excellent in press formability can be obtained by producing a clad steel sheet by use of the source blank for the stainless steel three-ply clad sheet produced so that the value of elongation $\epsilon_M$ calculated by the following Equation (2) is 40% or more:

$$\epsilon_M = \epsilon_0 \times t_0/(t_0+t_1) + \epsilon_1 \times t_1/(t_0+t_1) \quad (2)$$

where $t_0$ (mm) is a thickness of the core component, $t_1$ (mm) is a total thickness of the two face components, and $\epsilon_0$ (%) and $\epsilon_1$ (%) are elongations as material characteristics of the core component and the face components, respectively.

The present invention has been completed based on the above-mentioned findings, and the subject matters thereof are a stainless steel three-ply clad sheet and methods for producing the same shown in (1), (14) and (15), methods for producing a source blank for a stainless steel three-ply clad sheet shown in (3) to (7), (9) and (10), source blanks for stainless steel three-ply clad sheets shown in (2), (8) and (11), a method for producing a stainless steel three-ply clad plate for a solid polymer type fuel cell separator and a clad steel plate shown in (12) and (13), and a solid polymer type fuel cell separator and a fuel cell using the same shown in (16) and (17).

(1) A stainless steel three-ply clad sheet, employing a stainless steel having a B content of 0 to 0.3% by mass as a core component and a stainless steel having a B content of 0.3 to 2.5% by mass as face components each to be combined with each of major faces of the core component (hereinafter also referred to as "a first invention").

(2) A source blank for a stainless steel three-ply clad sheet, employing a stainless steel having a B content of 0 to 0.3% by mass as a core component, a stainless steel having a B content of 0.3 to 2.5% by mass as face components each to be combined with each of major faces of the core component, and protectors to be disposed on both side ends other than a working plane of the face components (hereinafter also referred to as "a second invention").

(3) A method for producing the source blank for a stainless steel three-ply clad sheet according to (2), comprising: disposing tabs on each boundary region formed by the core component, the face components and the protectors, in bonding a core component, face components each to be disposed on each of major faces of the core component, and protectors; and starting the bonding at the tabs (hereinafter also referred to as "a third invention").

(4) A method for producing a source blank for a stainless steel three-ply clad sheet, comprising producing a source blank for a clad steel sheet composed of a stainless steel having a B content of 0 to 0.3% by mass as a core component and a stainless steel having a B content of 0.3 to 2.5% by mass as face components each to be combined with each of major faces of the core component, through steps shown by the following Steps 1 to 5 (hereinafter also referred to as "a fourth invention"):

Step 1: disposing: on both side end faces, other than a working plane of the face component, protectors each with a length greater than the length of the side end face; and tabs each in abutting relation with an extension of the protector's surface to abut on the side end face of the face component, where the extension is an extra length portion exceeding the length of the side end face of the face component;

Step 2: performing bonding between the tabs and the protectors disposed in Step 1 and between the face component and the protectors at respective boundary regions, wherein the bonding starts from the boundary region between a tab and a protector as a starting point;

Step 3: removing the tabs and extended portions of the protectors bonded with the tabs to thereby obtain a bonded composite of the face component and protectors;

Step 4: piling the bonded composites of the face component and protectors obtained in Step 3 on the core component so that each bonded face of the core component contacts with each bonded face of the face components to thereby obtain a combined block; and Step 5: performing bonding between the face components and the core component and between the protectors and the core component at respective boundary regions in the combined block obtained in Step 4 to thereby obtain a source blank for a stainless steel three-ply clad sheet.

(5) The method for producing a source blank for a stainless steel three-ply clad sheet according to (3) or (4), wherein the width and/or length of the core component is, within a plane parallel to the working plane, larger than or smaller than the total width and/or length of the face components and the protectors in the bonded composites within the range of less than 7 mm for each side end and/or for each front/rear end (hereinafter also referred to as "a fifth invention").

(6) A method for producing a source blank for stainless steel three-ply clad sheet, comprising producing a source blank for a clad steel sheet composed of a stainless steel having a B content of 0 to 0.3% by mass as a core component and a stainless steel having a B content of 0.3 to 2.5% by mass as face components each to be combined with each of major faces of the core component, through steps shown by the following Steps 1 to 7 (hereinafter also referred to as "a sixth invention"):

Step 1: piling a face component on a core component so that each core component's face for cladding contacts with each face component's for cladding to thereby obtain a piled block;

Step 2: disposing, on both side ends, other than a working plane, of the piled block obtained in Step 1, protectors with a thickness covering the total thickness of the piled block and a length greater than the length of the side end faces of the block, and disposing tabs each in abutting relation with an extension of the protector's surface to abut on the side end face of the block, the extension being the extra length portion exceeding the length of the side end face of the piled block;

Step 3: performing bonding between the tabs and the protectors disposed in Step 2 and between the face components and the protectors at respective boundary regions, wherein the bonding starts from the boundary regions between the tabs and the protectors as a starting point;

Step 4: removing the tabs and extended portions of the protectors bonded with the tabs to thereby obtain a bonded composite of the core component, face components and protectors;

Step 5: disposing tabs at end portions of the boundary regions between the face components and the protectors onto the working plane of the bonded composite of the core component, face components and protectors produced in Step 4 so that one of faces of each tab forms the same plane with the front/rear end face on which no protector is disposed in Step 2;

Step 6: performing, in the bonded composite of the core component, face components and protectors where the tabs is disposed thereon in Step 5, bonding at the boundary regions between the face components and the core component on the front/rear end face having no protector disposed thereon wherein the bonding starts from the protector's site on the extended line of said boundary region as a starting point, and further bonding the boundary regions between the face components and the protectors and between the core component and the protectors, which are on the front/rear end faces, wherein the bonding starts from the tab's site as a starting point; and Step 7: removing the tabs to thereby obtain a source blank for a stainless steel three-ply clad sheet.

(7) The method for producing a source blank for a stainless steel three-ply clad sheet according to any one of (3) to (6), wherein the bonding is performed by welding with high energy density (hereinafter also referred to as "a seventh invention").

(8) The source blank for a stainless steel three-ply clad sheet according to (2), wherein each core component's surface and face component's surface to be piled respectively has a flatness of 3 mm or less (hereinafter also referred to as "an eighth invention").

(9) The method for producing a source blank for a stainless steel three-ply clad sheet according to any one of (3) to (7), wherein each core component's surface and the face component's surface has a flatness of 3 mm or less (hereinafter also referred to as "a ninth invention").

(10) The method for producing a source blank for a stainless steel three-ply clad sheet according to (7) or (9), wherein when the depth of depression from a surface of a workpiece to be welded is given by a symbol A and the bead depth from the surface of the workpiece to be welded is given by a symbol B, in a welded part cross section by welding with high energy density beam directed vertical to the working plane, A is 5 mm or less and B is 15 mm or more.

(11) A source blank for a stainless steel three-ply clad sheet, which is produced by the method for producing a source blank for a stainless steel three-ply clad sheet according to any one of (3) to (7) and (9), and satisfies a relation represented by the following Equation (1) (hereinafter also referred to as "an eleventh invention").

$$\epsilon_0 \times t_0/(t_0+t_1) + \epsilon_1 t_1/(t_0+t_1) \geqq 40\% \quad (1)$$

where $t_0$ (mm) is a thickness of the core component, $t_1$ (mm) is a total thickness of the two face components, and $\epsilon_0$(%) and $\epsilon_1$(%) are elongations as material characteristics of the core component and the face components, respectively.

(12) A method for producing a stainless steel three-ply clad plate for a solid polymer type fuel cell separator, comprising heating a source blank for a stainless steel three-ply clad sheet produced by the method according to any one of (3) to (7), (9) and (10) or the source blank for a stainless steel three-ply clad sheet according to any one of (2), (8) and (11) to a temperature of 1000 to 1200° C., and then performing hot pre-working with a working finishing temperature of 600° C. or higher thereto (hereinafter also referred to as "a twelfth invention").

(13) A stainless steel three-ply clad plate for a solid polymer type fuel cell separator, which is produced by the method according to (12) (hereinafter also referred to as "a thirteenth invention").

(14) A method for producing a stainless steel three-ply clad plate for a solid polymer type fuel cell separator, comprising heating a source blank for a stainless steel three-ply clad sheet produced by the method according to any one of (3) to (7), (9) and (10) or the source blank for a stainless steel three-ply clad sheet according to any one of (2), (8) and (11) to a temperature of 1000 to 1200° C., and then performing rough rolling, hot rolling with a rolling finishing temperature of 600° C. or higher, and cold rolling thereto (hereinafter also referred to as "a fourteenth invention").

(15) A method for producing a stainless steel three-ply clad sheet for a solid polymer type fuel cell separator, comprising further heating the a stainless steel three-ply clad plate according to (13) at 1000 to 1200° C., and then performing rough rolling, hot rolling with a rolling finishing temperature of 600° C. or higher and cold rolling thereto (hereinafter also referred to as "a fifteenth invention").

(16) A solid polymer type fuel cell separator, using a stainless steel three-ply clad sheet produced by the method according to either of (14) or (15) (hereinafter also referred to as "a sixteenth invention").

(17) A solid polymer type fuel cell, using the solid polymer type fuel cell separator according to (16) (hereinafter also referred to as "a seventeenth invention").

In the present invention, the "working plane" means a plane to be subjected to a working process such as rolling or forging, and the "side end faces, other than a working plane," means at least two side end faces as opposed to each where the working plane is exempted. In rolling, for example, two longitudinal side end faces which do not contact with a milling roll are meant, or front and rear end faces may be included in them. In forging, two side end faces as opposed to each other which do not contact with a ram are meant, or three to four faces including them may be meant.

The "larger or smaller within the range of less than 7 mm per each side end" means that larger or smaller within the range of less than 7 mm per each side end among two side ends as opposed to each other for the core component, which is meant for "larger or smaller than the other component at both side ends thereof, excluding the case that larger at one side, smaller at the other, but larger than the other component in all, and vice versa . . . .

The "thicknesses of the core component and the face component" means respective dimensions vertical to the working plane, and the "thickness of the protector" means a protector dimension in the thickness-wise direction of the piled block of the core component and the face components, when the protectors are disposed on each side end face of the piled block. The "width of the protector" means a protector's dimension in a direction orthogonal to a weld line of the protectors and the face components within a plane parallel to the working plane.

In the following descriptions, "%" in chemical compositions means "% by mass".

BRIEF DESCRIPTION OF THE DRAWINGS

FIG. 1 are views showing steps in the method for producing a source blank for a stainless steel three-ply clad sheet of the fourth invention, where

FIG. 2 are views showing steps in the method for producing a source blank for a stainless steel three-ply clad sheet of the sixth invention, where

FIG. 3 are views further showing steps in the method for producing a source blank for a stainless steel three-ply clad sheet of the sixth invention, where

FIG. 4 are views showing steps in the method for producing a source blank for a stainless steel three-ply clad sheet of the fourth invention, where

FIG. 5 are views showing steps in the method for producing a source blank for a stainless steel three-ply clad sheet of the sixth invention, where

FIG. 6 schematically show depression of weld bead and bead drop, where

FIG. 7 show a structure of a solid polymer type fuel cell, where FIG. 8 are views showing structures of source blanks for stainless steel three-ply clad sheets used in Examples, where

BEST MODE FOR CARRYING OUT THE INVENTION

Figure 1A:
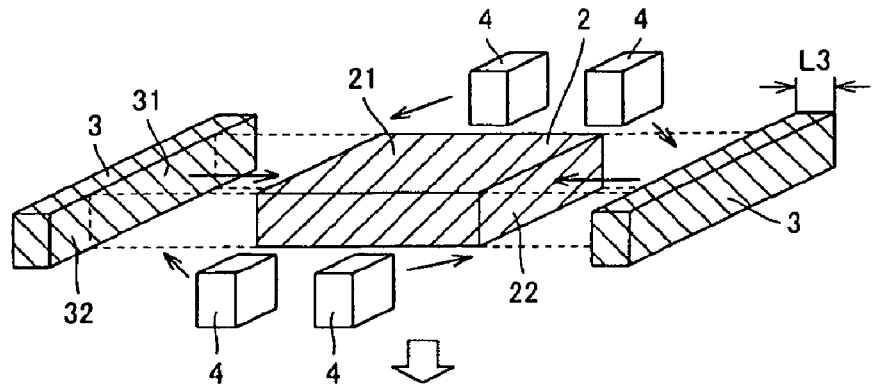
FIG. 1A shows a method of arranging protectors and tabs for a face component.

As described above, the present invention relates to a method for producing a source blank for a stainless steel three-ply clad sheet, said source blank for steel clad sheet, methods for producing a plate and a steel sheet for a solid polymer type fuel cell separator using said source blank for steel sheet, a solid polymer type fuel separator, and a solid polymer type fuel cell. The present invention will be described further in detail.

1. Components of a Stainless Steel Three-ply Clad Sheet

The stainless steel three-ply clad sheet of the present invention comprises a stainless steel having a B content of 0 to 0.3% as a core layer component and a stainless steel having a B content of 0.3 to 2.5% as face layer components each to be combined with each of major faces of the core layer component in a sandwiching manner. The face stainless steel and the core stainless steel have the following structures.

1-1. Face Stainless Steel

The face stainless steel is combined with each major face of the core stainless steel for making a clad steel sheet. When a B content thereof is less than 0.3%, the number of projections of boride which is cropped out of the surface covered with a passivated film and exposed to the air is reduced, resulting in an increased electric resistance in contact (hereinafter also referred to as "contact resistance").

When the B content exceeds 2.5%, the formability necessary for working into a separator cannot be ensured. Therefore, a B content of the face stainless steel is set from 0.3 to 2.5%. The B content is desirably from 0.8 to 2%.

1-2. Core Stainless Steel

A smaller B content is more preferable in the core stainless steel, and the content is thus set from 0 to 0.3%. When the B content exceeds 0.3%, cracking can occur during hot working. Therefore, although the core stainless steel may be free from B, the content of B, if included, is controlled to 0.3% or less. The core stainless steel desirably has a chemical composition similar to that of the face stainless steel while it may be either of ferrite-based stainless steel or austenitic stainless steel.

When metals to contact with each other have largely differed chemical compositions, the potential difference therebetween is increased, resulting in a promoted corrosion. In the present invention, therefore, a component design is desirably performed so as to minimize the potential difference between stainless steels used as the face components and the core component from the point of ensuring corrosion resistance in the resulting stainless steel clad sheet.

In the method for producing the source blank for steel sheet specified in the fourth invention, the size of the core component is desirably set larger than or smaller than the total dimension of the face components and the protectors as specified in the fifth invention. This reason is to prevent weld metal dropping when welding with high energy density beam directed parallel to a working plane of the core component surface or the face component surface (or horizontal welding).

When the width and/or length of the core component is set larger than the total width and/or length of the face component and the protectors (bonded composite) in preparing a combined block, the boundary regions between the bonded composite (composed of the upper face component and protectors) and the core component are to be welded first, and the welding of the boundary regions between the lower bonded composite (composed of the lower face component and protectors) and the core component is performed after turning over the combined block of these components. When the width and/or length of the core component is smaller than the total width and/or length of the face component and the protectors (bonded composite), reversely, the boundary regions between the lower bonded composite (composed of the lower face component and protectors) and the core component is to be welded first, and the welding of the boundary regions between the upper bonded composite (composed of the upper face component and protectors) and the core component is performed after turning over the combined block of these components.

2. Overall Steps in Producing a Source Blank for a Stainless Steel Three-ply Clad Sheet Steps for producing a source blank for clad steel sheet will be then described. The production method (assembling method) of the source blank for clad steel sheet includes two kinds of assembling methods, or the method of the fourth invention (hereinafter also referred to as "Assembling Method A") and the method of the sixth invention (hereinafter also referred to as "Assembling Method B").

2-1. Assembling Method A

Figure 1B:
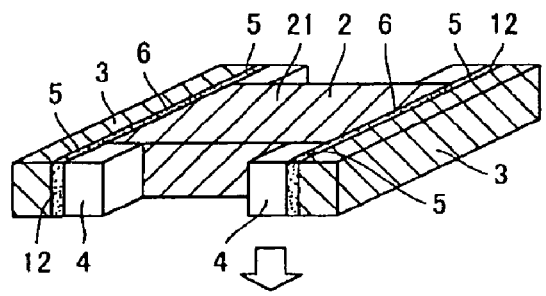
FIG. 1B shows how the face component, the protectors and the tabs are set.
Figure 1C:
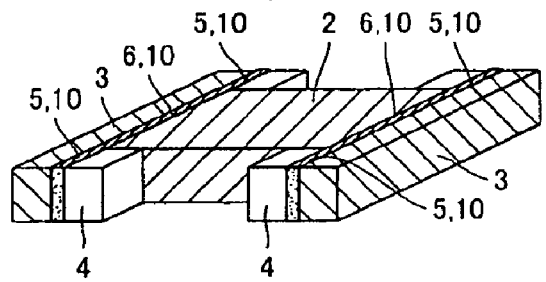
FIG. 1C shows bonding the face component with the protectors and with the tabs at respective boundary regions.
Figure 1D:
FIG. 1D shows a bonded composite composed of the face component and the protectors which is obtained by removing the tabs and the extended portions of the protectors bonded with the tabs.
Figure 1E:
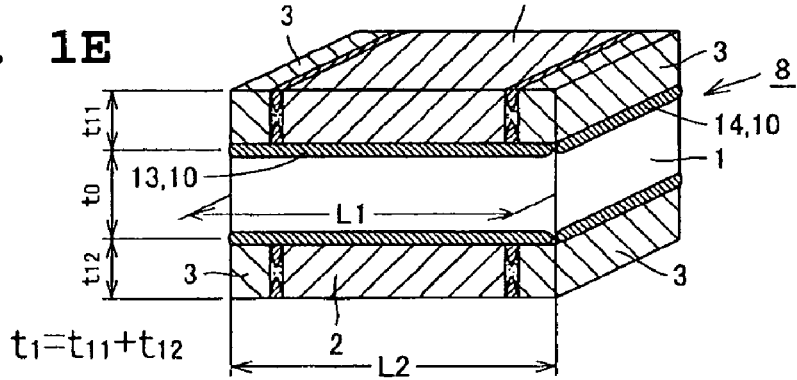
FIG. 1E shows a source blank for a stainless steel three-ply clad sheet obtained by piling the bonded composites of the face component and protectors on the top and back faces of a core component in a sandwiching manner, and bonding each boundary region on side end faces of the piled block.

FIG. 1 are views showing steps in the method for producing a source blank for a stainless steel three-ply clad sheet of the fourth invention, where FIG. 1A shows a method of disposing protectors and tabs on a face component, FIG. 1B shows how the face component, the protectors and the tabs are set, FIG. 1C shows bonding the face component with the protectors and with the tabs at respective boundary regions, FIG. 1D shows a bonded composite composed of the face component and protectors obtained by removing the tabs and the extended portions of the protectors bonded with the tabs, and FIG. 1E shows a source blank for a stainless steel three-ply clad sheet obtained by piling the bonded composites of the face component and protectors on both major faces of a core component, and bonding at each boundary region on all side end faces of the piled block. Each step will be then described.

1) Step 1

In Step 1, protectors 3 with a length greater than the length of side end faces 22 of a face component 2 are disposed on the side end faces 22, other than a working plane 21, of the face component 2, and tabs 4 are disposed in abutting relation with an extension 32 of the protector's surface 31 to abut on the side end face 22 of the face component 2, where the extension 32 is an extra length portion exceeding the length of the side end face 22 of the face component 2.

For preventing weld cracking during bonding at boundary regions 6 between the face component 2 and the protectors 3 and at boundary regions 5 between the tabs 4 and the protectors 3, the protectors 3 and the tabs 4 are desirably disposed on the face component 2 while interposing B-containing inserts 12 to the respective boundary regions. Each face of the core component 1 for cladding with the face components 2 is desirably subjected to a preliminary abrasive machining. As the machining method of the relevant face for cladding, for example, milling can be adapted.

2) Step 2

In Step 2, bonding between the tabs 4 and the protectors 3 disposed in Step 1 and between the face component 2 and the protectors 3 at the respective boundary regions 5 and 6 is performed, starting at the boundary regions 5 between the tabs 4 and the protectors 3. The reason for starting the bonding at the boundary regions 5 between the tabs 4 and the protectors 3 is to prevent bead drop in bonding by welding with high energy density as described below. Here, the reference numeral 10 in the drawings shows a weld bead.

3) Step 3

In Step 3, a bonded composite 7 composed of the face component 2 and the protectors 3 is obtained by removing the tabs 4 and extended portions of the protectors bonded with the tabs 4.

4) Step 4

In Step 4, the bonded composites of the face components 2 and protectors 3 produced in Step 3 are piled on the core component 1 so that each face of the core component 1 to be clad contacts with each major surface of the face components 2 to be in clad relation therewith to thereby obtain a combined block.

Each relevant face of the face components 2 to be in clad relation with the core component 1 is desirably subjected to a preliminary abrasive machining. As the machining method of the relevant face for cladding, for example, milling can be adapted.

5) Step 5

In Step 5, the face components 2 and the protectors 3 are bonded to the core component 1 at respective boundary regions 13 and 14 in the combined block obtained in Step 4 to thereby obtain a source blank for a stainless steel three-ply clad sheet 8.

The source blank for clad sheet 8 produced through the above steps is heated, then rolled or forged into a stainless steel clad sheet, and a solid polymer type fuel cell separator or a solid polymer type fuel cell is further produced using the sheet.

2-2. Assembling Method B

Figure 2A:
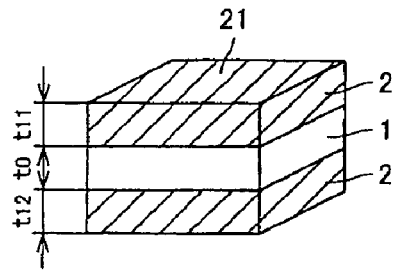
FIG. 2A shows a piled block obtained by piling face components on major faces of a core component in a sandwiching manner.
Figure 2B:
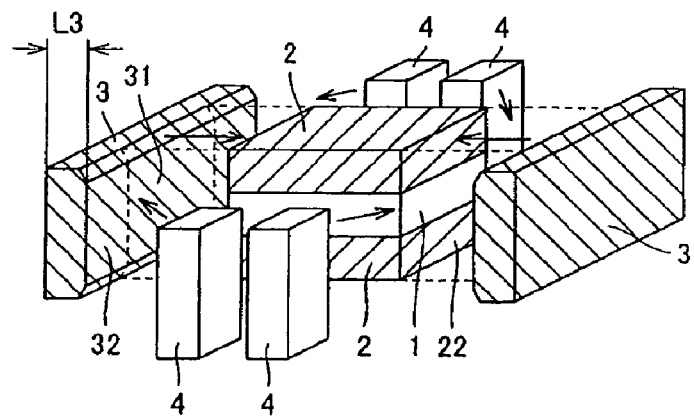
FIG. 2B shows a method of arranging protectors and tabs around the piled block.
Figure 2C:
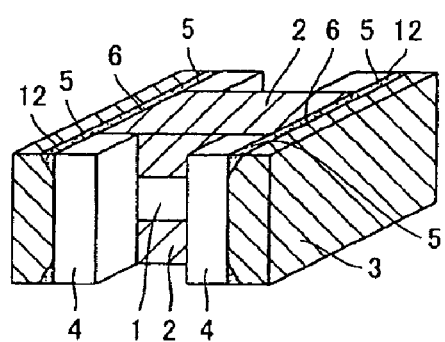
FIG. 2C shows how the face components, the protectors and the tabs are set.
Figure 2D:
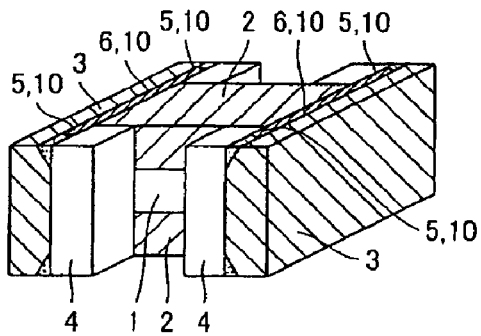
FIG. 2D shows bonding the face components with the protectors and with the tabs at respective boundary regions.

FIG. 2 are views showing steps in the method for producing a source blank for a stainless steel three-ply clad sheet of the sixth invention, where FIG. 2A shows a piled block obtained by piling face components on major faces of a core component in a sandwiching manner, FIG. 2B shows a method of disposing protectors and tabs on the piled block, FIG. 2C shows how the face components, the protectors and the tabs are set, and FIG. 2D shows bonding the face components with the protectors and with the tabs at respective boundary regions.

Figure 3A:
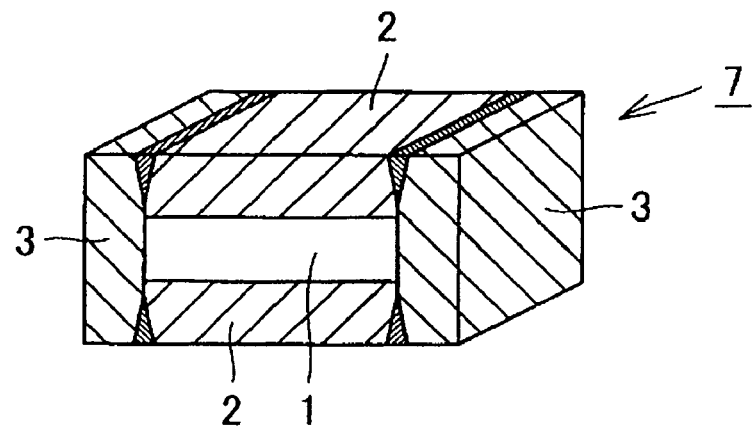
FIG. 3A shows a bonded composite composed of the core component, face components and protectors which is obtained by removing the tabs and extended portions of the protectors bonded with the tabs in FIG. 2D.
Figure 3B:
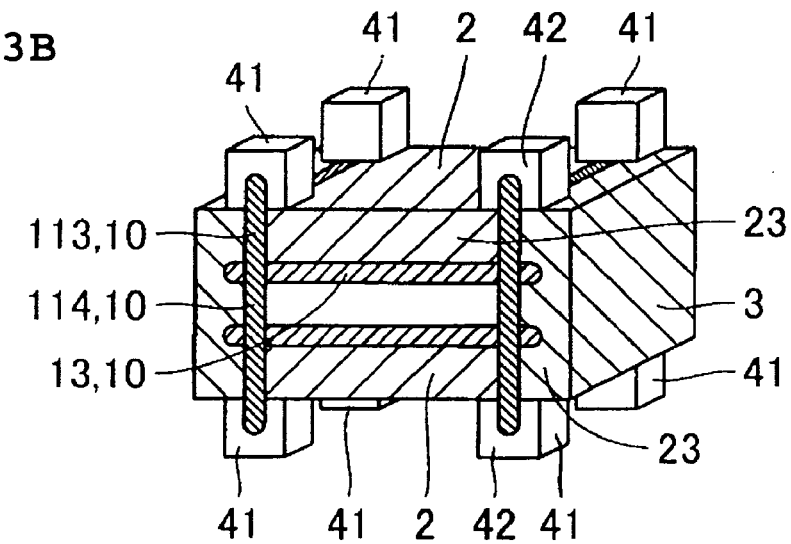
FIG. 3B shows bonding at each boundary region on the side end faces having no protector thereon for the bonded composite of the core component, face components and protectors after setting the tabs to the bonded composite.
Figure 3C:
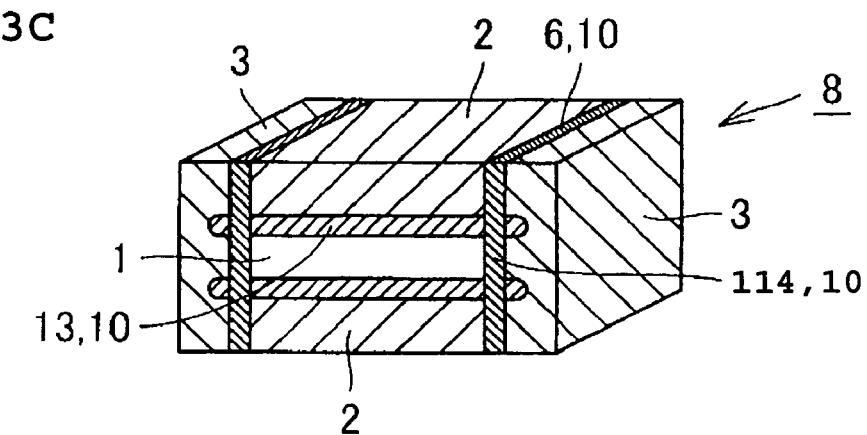
FIG. 3C shows a source blank for a stainless steel three-ply clad sheet obtained by removing the tabs.

FIG. 3 are views further showing steps in the method for producing a source blank for a stainless steel three-ply clad sheet of the sixth invention, where FIG. 3A shows a bonded composite of the core component, face components and protectors obtained by removing the tabs and the extended portions of the protectors bonded with the tabs in FIG. 2D, FIG. 3B shows bonding at each boundary region on the side end faces having no protector thereon for the bonded composite (of the core component, face components and protectors) after disposing the tabs on the bonded composite, and FIG. 3C shows a source blank for a stainless steel three-ply clad sheet obtained by removing the tabs. Each step will be then described.

1) Step 1

In Step 1, the face components 2 are piled on the core component 1 so that each relevant face of the core component 1 to be clad contacts with the relevant face of the face components 2 to be in cladding relation therewith to thereby obtain a piled block. The respective faces for cladding regarding the core component 1 and the face components 2 are desirably subjected to a preliminary abrasive machining. As the machining method of the relevant faces for cladding, for example, milling can be adapted.

2) Step 2

In Step 2, protectors 3 with a thickness covering the total thickness $(t_0+t_1)$ of the piled block obtained in Step 1 and a length greater than the length of the side end faces 22 of the piled block are disposed on side end faces 22 other than a working plane 21 thereof, and tabs 4 are disposed in abutting relation with an extension 32 of the protector's surface 31 to abut on the side end surface 22 of the face component 2., where the extension 32 is an extra length portion exceeding the length of the side end face of the piled block For preventing weld cracking in bonding at the boundary regions 6 between the face components 2 and the protectors 3 and at the boundary regions 5 between the tabs 4 and the protectors 3, the protectors 3 and the tabs 4 are desirably disposed on the face components 2 while interposing B-containing inserts 12 to the respective boundary regions.

3) Step 3

In Step 3, bonding between the tabs 4 and the protectors 3 disposed in Step 2 and between the face components 2 and the protectors 3 at the respective boundary regions 5 and 6 is performed, starting at the boundary regions 5 between the tabs 4 and the protectors 3 as the starting point. The reason for starting the bonding at the boundary regions 5 between the tabs 4 and the protectors 3 is to prevent weld metal dropping (hereinafter also referred to as "bead drop") in bonding by welding with high energy density as described below.

4) Step 4

In Step 4, a primary bonded composite 7 composed of the core component 1, the face components 2 and the protectors 3 is obtained by removing the tabs 4 and extended portions of the protectors bonded with the tabs 4.

5) Step 5

In Step 5, new tabs 41 are disposed at the end portions of the boundary regions 6 between the face components 2 and the protectors 3 on the working plane 21 for the primary bonded composite 7 of the core component 1, face components 2 and protectors 3 formed in Step 4 so that one 42 of faces of each tab forms the same plane with the side end face 23 of the combined block, on which no protector 3 is disposed in Step 2.

6) Step 6

In Step 6, bonding at boundary regions 13 between the face components 2 and the core component 1 on each side end face 23 having no protector 3 thereon, in the primary bonded composite 7 of the core component 1, face components 2 and protectors 3 having the tabs 41 thereon in Step 5, is performed with the protectors 3 as a starting point, and bonding at boundary regions 113 between the face components 2 and the protectors 3 and boundary regions 114 between the core component 1 and the protectors 3 on the side end face 23 where the bonding starts from the tabs 41 as a starting point.

7) Step 7

In Step 7, the tabs 41 are removed to thereby obtain a source blank for a stainless steel three-ply clad sheet 8 in which the core component 1, the face components 2 and the protectors 3 are mutually bonded.

The source blank for clad sheet 8 produced through the above steps is heated and then rolled or forged into a stainless steel clad sheet, and a solid polymer type fuel cell separator or a solid polymer type fuel cell is further produced using the sheet thus made.

3. Integration by Electron Beam Welding

3-1. Electron Beam Welding

As described above, examples of the welding with high energy density include plasma welding, electron beam welding and laser welding. For preventing troubles such as disbonding between the face components and the core component or disbonding of the protectors therefrom during hot rolling or cold rolling, a welding method ensuring high bonding strength need to be adopted, and the welding with high energy density is used from this point of view.

Application of electron beam welding as the welding with high energy density will be then described.

Various methods are adaptable to bond slabs used for producing a stainless steel three-ply clad sheet and, for example, explosive welding, ordinary welding, casting and the like are generally used. Particularly, the welding process has been extensively adapted since it can be easily practiced by use of a simple apparatus without requiring any special facility.

However, the conventional welding process requires multilayer welding for preventing the disbonding between the face components 2 and the core component 1 during hot working, and a lot of welding time is needed therefor. It is difficult to perfectly remove the air between the core component and the face components at the time of welding, and a number of defects resulted from the remaining air can be detected in ultrasonic test after hot working.

According to the electron beam welding, the risk of defects caused by the remaining air can be eliminated since the welding is performed in vacuum with air pressure of 0.133 Pa ($1\times10^{-3}$ Torr) or less, and sufficient strength can be ensured by one pass of welding. Therefore, the electron beam welding can attain a significant reduction in welding time, compared with the conventional welding process, with few defects detected by ultrasonic test, and thus has remarkably excellent features in both quality and yield.

3-2. Flatness of Face to be Piled

Each face of the core component and the face components intended for being piled is preferably subjected to machining or the like so as to have a flatness of 3 mm or less. This reason is to ensure sufficient cladding performance between the piled faces in hot rolling described below.

When the flatness exceeds 3 mm, inferior cladding tends to occur in hot rolling, which is apt to lead to troubles such as disbonding of components or swelling defects in the following steps, and appropriate weld bead cannot be formed in welding the boundary region between the core component and the face components. The flatness is desirably controlled to 1 mm or less from the viewpoint of prevention of the inferior cladding and of the defective weld bead in the boundary welding between the core component and the face components.

For insuring a uniform clad ratio in a final product (ratio of the thickness of the face components to the total thickness of the clad steel sheet), the respective thickness distributions of the core component and the face components are preferably minimized as much as possible, in addition to control of the flatness of surfaces to be clad.

The flatness is generally represented by wave shape, buckling, warping or the like. In the present invention, the wave shape is adopted as representing the flatness, and the flatness is specified by a wave height obtained by bringing a 2-m length straight gauge into contact with the intended surfaces of the core component and the face components.

4. Bonding of Protector

4-1. Bonding Condition

In the source blank for a stainless steel three-ply clad sheet 8 of the present invention, cracking may occur during hot working since the face components 2 are composed of a B-containing stainless steel. Therefore, the protectors 3 are bonded to the side end surfaces 22 other than the working plane 21 of the face component 2. The B content of the material for the protectors 3 is desirably controlled to 0.3% or less. As described above, the protectors 3 containing B content as low as 0.3% or less are bonded to the side end surfaces 22 other than the working plane 21 of the face component 2, whereby edge cracking during rolling can be prevented.

Since the protectors 3 are cut and removed after completion of rolling, the chemical composition thereof is not particularly specified except for B. The protectors 3 could be disbonded due to buckling during hot working. For preventing this, the width of the protectors 3 (dimension shown by L3 in FIG. 1A or FIG. 2B) is desirably set to 10 mm or more.

The stainless steel for the face components 2 as a base metal to which the protectors 3 are bonded is a B-containing stainless steel as described above, and the welding in combination with the protectors 3 free from B can cause weld cracking due to enhanced crack susceptibility of weld metal. Namely, this is because the boride (boronized compound) is difficult to generate from liquid phase in the weld metal diluted with such protectors 3, and the annihilation of low-melting point phase by virtue of B effects is delayed.

Therefore, it is preferable that the B contents in the protectors 3 and the stainless steel for the face components 2 as a base metal are adjusted, and the bonding of the protectors 3 thereto is performed while placing the B-containing insert 12 in the form of a sheet, a foil or powder at the boundary regions between the face components 2 and the protectors 3 for preventing the weld cracking. When the insert 12 is used in the form of powder or the like, a V-shaped weld-end groove, for example, is preferably provided at each boundary region of the protectors 3 with the face components 2 and with the tabs 4.

4-2. Electron Beam Welding Condition

1) Welding Direction, Depth of Bead Concave, and Penetration Depth of Bead, Etc.

Figure 4A:
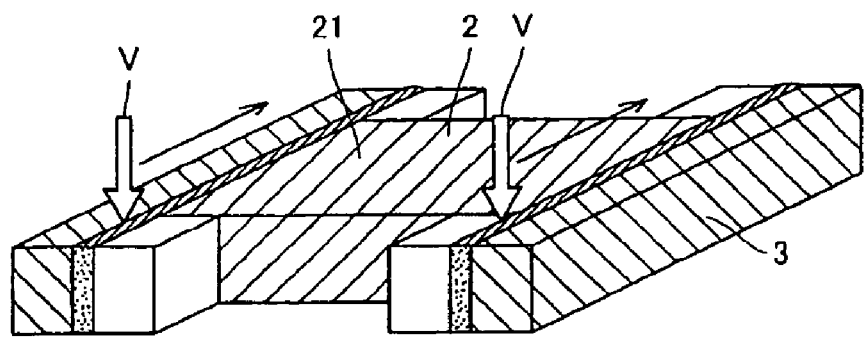
FIG. 4A shows a method of bonding the face component with the protectors and with the tabs at respective boundary regions in detail.
Figure 4B:
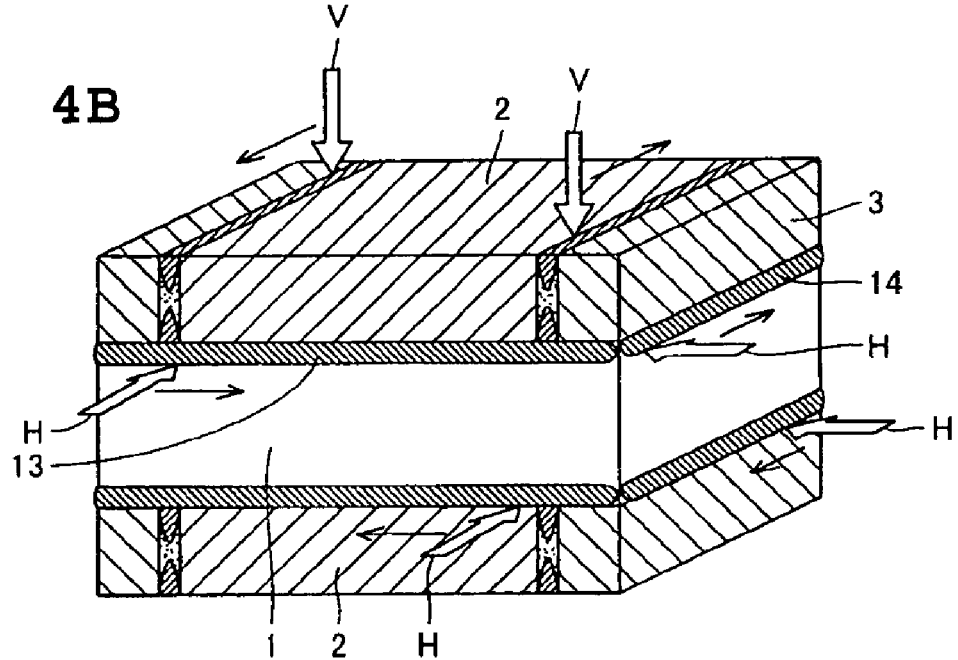
FIG. 4B shows a method of bonding the core component with the face components and with the protectors at respective boundary regions in the combined block in detail.

FIG. 4 are views showing steps in the method for producing a source blank for a stainless steel three-ply clad sheet of the fourth invention (Assembling Method A), where FIG. 4A shows a method of bonding the face component with the protectors and with the tabs at respective boundary regions in detail, and FIG. 4B shows a method of bonding the core component with the face components and with the protectors at respective boundary regions in the combined block in detail.

Figure 5A:
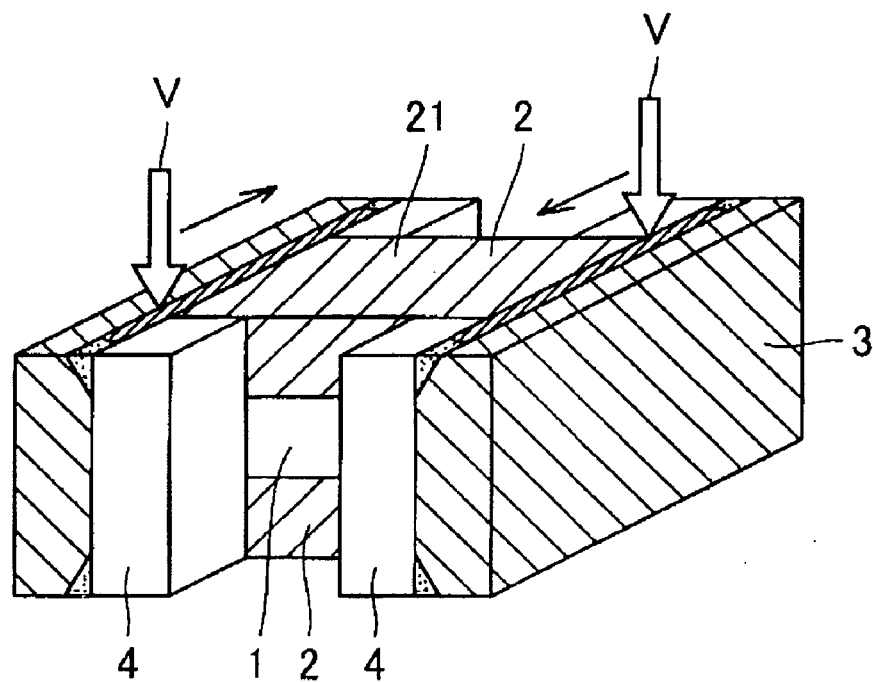
FIG. 5A shows a method of bonding the face components with the protectors and with the tabs at respective boundary regions in detail.
Figure 5B:
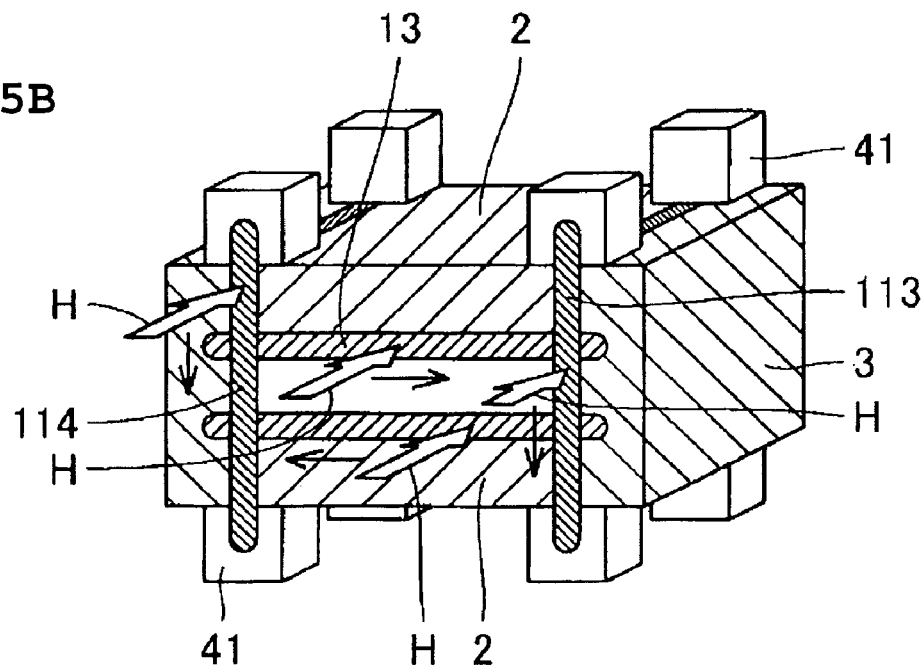
FIG. 5B shows a method of bonding each boundary region on a side end face having no protector thereon for the bonded composite of the core component, face components and protectors after setting the tabs to the bonded composite in detail.

FIG. 5 are views showing steps in the method for producing a source blank for a stainless steel three-ply clad sheet of the sixth invention (Assembling Method B), where FIG. 5A shows a method of bonding the face components with the protectors and with the tabs at respective boundary regions in detail, and FIG. 5B shows a method of bonding each boundary region on side end surfaces having no protector thereon for the bonded composite of the core component, face components and protectors after disposing the tabs on the bonded composite in detail.

As shown in FIG. 4A and FIG. 5A, in bonding the protectors with the face components and with the tabs at respective boundary regions, welding is performed, as shown by a symbol V in the figures, while horizontally moving the torch of electron beam, the electron beam being oriented to a direction vertical (downward) to the working plane 21 of the face component 2. The welding in such a condition will be referred to as "vertical (downward) welding" in the following description.

As shown in FIG. 4B in bonding of the core component 1 with the face components 2 and with the protectors 3 at respective boundary regions 13 and 14, welding is performed while moving electron beam with the direction thereof being set parallel to the working plane 21 of the face component 2. Similarly, as shown in FIG. 5B, in the bonded composite 7 of the core component 1, face components 2 and protectors 3 having the tabs 41 disposed thereon, welding is performed while the electron beam is oriented to the direction (horizontal) parallel to the working plane 21 of the face component 2 as shown by H in the figure, in bonding of the boundary regions 13 between the face components 2 and the core component 1 on the side end face 23 having no protector disposed thereon, as well as in bonding between the face components 2 and the protectors 3 and between the core component 1 and the protectors 3 at the respective boundary regions 113 and 114 on the side end face 23. The welding in such a condition is referred to as "horizontal welding" in the following description.

2) Vertical Welding

In the vertical welding, weld metal dropping may occur at a starting portion of welding if no tab is provided, resulting in solidification cracking started from this portion. Therefore, the welding is started at the part of the tabs, and welding current is controlled to increase in a sloping manner at the start of welding and to decrease in a sloping manner at the end of welding. According to this, formation of weld bead between the face components and the protectors of the main body can be stabilized while preventing bead drop. Further, contribution to facility protection including a cathode can be also expected by increasing and decreasing the welding current in a sloping manner.

Figure 6A:
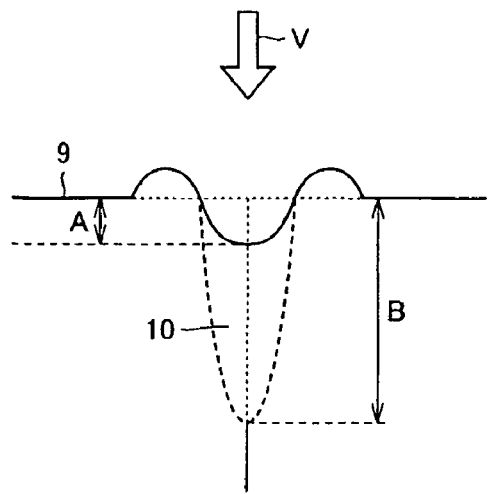
FIG. 6A is a cross sectional view of the bead in welding in a vertical direction.
Figure 6B:
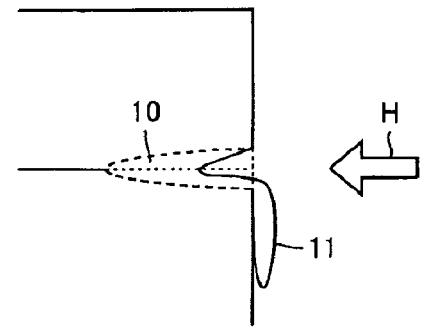
FIG. 6B is a cross sectional view of the bead in welding in a horizontal direction.

FIG. 6 schematically show depression of weld bead 10 and bead drop, where FIG. 6A is a cross sectional view of a bead in vertical welding, and FIG. 6B shows a cross sectional view of a bead in horizontal welding.

When the depth of weld bead is increased by setting a large welding current in vertical welding (V direction), as shown in the same figure A, bead concave (depression) occurs at a central portion of the bead in a section vertical to the direction of the weld bead, and bead convex (projection) occurs at both sides of the bead. It is not desirable to leave such a bead as it is since the bead with both projected sides remains on the surface as surface defects in the following rolling process.

When the depth of bead concave from a surface of a workpiece to be welded is given by a symbol A, it is desirable to control the value of A to 5 mm or less, for preventing such surface defects resulted from bead convex in the rolling process.

When the value of A exceeds 5 mm after the vertical welding, it is preferable that cosmetic welding for filling up a depressed portion by transferring the metal of projected portions located at both sides of the depressed portion is performed to control the value of A to 5 mm or less. When the projected portion is partially left even after the cosmetic welding, the remaining projected portion is removed by use of a grinder or a grinding wheel. Since the depressed portion (concave portion) is small, and projected portions located at both sides of the depressed portion are also small in the case of low welding current, only the projected portions are removed by use of a grinder or grinding wheel.

Further, for preventing the disbonding between the protectors and the face components during rolling and for ensuring a sufficient effect for preventing edge cracking, the value of the bead depth B is desirably set to 15 mm or more to ensure sufficient weldment strength.

3) Horizontal Welding

In the horizontal welding (H direction), bead drop 11 can occur as shown in FIG. 6B. The occurrence of the bead drop 11 is not desirable since this portion can be peeled off during rolling, causing rolled surface defects.

For preventing this, it is effective to provide a step between the core component and the face components by setting the width and/or length of the core component larger than or smaller than the total width and/or length of the face components and the protectors as described later.

In the horizontal welding, although bead drop at welding starting and ending positions can be prevented by disposing the tabs similarly to vertical welding, this method is not desirable since the operating efficiency is reduced. The bead drop at welding starting and ending positions is desirably prevented by increasing and decreasing the welding current in a sloping manner at the start and end of welding as described above.

If bead drop as shown in FIG. 6B occurs in spite of the operation as described above, a depressed portion formed by the bead drop is filled back by cosmetic welding, and a bead drop portion is removed by use of a grinder or a grinding wheel.

5. Sizes of Core Component, Face Component and Protector

In the method for producing a source blank for steel sheet according to the fourth invention, particularly, for preventing the bead drop in horizontal welding, it is desirable to set the width and/or length of the core component larger than or smaller than the total width and/or length of the face components and the protectors in the bonded composite of the face components and protectors within the range of less than 7 mm per one side end, within a plane parallel to a working plane by rolling or forging, as specified in the fifth invention.

The weld metal dropping in electronic beam welding can be desirably prevented by setting the width and/or length of the core component larger than or smaller than the total width and/or length of the face components and the protectors in the bonded composite of the face components and protectors. In this case, when the width and/or length of the core component is L1, and the total width and/or length of the face components and the protectors in the bonded composite of the face components and protectors is L2, as shown in FIG. 1E, the above-mentioned effect cannot be sufficiently exhibited even if the relation represented by L1>L2 or L1<L2 is simply satisfied, and it is desirable to set the size of the core component larger or smaller at each side end within the range of less than 7 mm per one side end.

The extent to increase or decrease the size of the core component to the total width and/or length of the face components and the protectors is further desirably 0.5 to 7 mm per one side end from the viewpoint of preventing the weld metal dropping. However, since edge cracking can be caused by edge tension in rolling if the extent to increase or decrease the size of the core component exceeds 5 mm per one side end, the size of the core component is further desirably set to be larger or smaller within the range of 0.5 mm or more and less than 5 mm per one side end.

The core component is further desirably subjected to chamfering from the viewpoint of preventing weld metal dropping and cracking.

6. Thicknesses of Face Component and Core Component and Elongation Properties of Material Elongation properties (ductility) of clad steels significantly influence on the press formability of the three-ply clad steel sheet. The elongation of the clad steel sheet is represented by the following Equation (3), $$\epsilon_0 \times t_{s0}/(t_{s0}+t_{s1}) + \epsilon_1 \times t_{s1}/(t_{s0}+t_{s1}) \quad (3)$$

where $t_{s0}$(mm) is a wall thickness of the core component in a steel plate form, $t_{s1}$ (mm) is a total wall thickness of the two face components in the steel plate form, and $\epsilon_0$ (%) and $\epsilon_1$(%) are elongations of the core component and the face components, respectively, as material characteristics of a product sheet just before press forming.

Since the face components and the core component constituting the source blank for clad steel sheet are reduced in thickness in a mutually bonded state by rolling or forging, and made into the clad steel sheet, values of the ratio $t_{s0}/(t_{s0}+t_{s1})$ and the ratio $t_{s1}/(t_{s0}+t_{s1})$ in Equation (3) are equal to those of the ratio $t_0/(t_0+t_1)$ and the ratio $t_1/(t_0+t_1)$ in Equation (2) in the stage of the source blank for clad steel sheet, respectively. Accordingly, by adjusting the thicknesses of the face components and the core component in the source blank for a stainless steel three-ply clad sheet, the wall thickness ratio of the face components and the core component in the a stainless steel three-ply clad steel can be adjusted, whereby elongation properties of the a stainless steel three-ply clad sheet can be controlled.

The more excellent the elongation of the clad steel sheet is, the better the press formability is. It was found from the present inventors' theoretical examinations that cracking can occur in the process of press-forming the clad steel sheet into a shape of fuel cell separator when the elongation calculated by Equation (3), that is, the value of elongation $\epsilon_M$ calculated by Equation (2) is less than 40% as described below. Therefore, the thicknesses of the face components and the core component and the elongations that are material characteristics of the face components and the core components are desirably adjusted or selected so that the value obtained by Equation (2) is 40% or more.

In order to equally exhibit battery performance at each face component, the face components to be abutted on the major surfaces of the core component desirably have the same thickness. With respect to elongations $\epsilon_0$ (%) and $\epsilon_1$(%) that are material characteristics of the core component and the face components, desirably, each of the components to be used is subjected to tensile test prior to production of the source blank for a stainless steel three-ply clad sheet, and each measured value obtained thereby (average value in case of multiple tests) is adapted.

7. Production of Clad Steel Sheet Using Source Blank for Clad Steel Sheet

When the heating temperature of a B-containing material for clad steel sheet is lower than 1000° C., disbonding may occur during rolling since flow stress is increased during rolling due to the low temperature. When the heating temperature exceeds 1200° C., cracking may occur due to melting of the boride. From these reasons, the heating temperature of the source blank for clad steel sheet is set desirably from 1000 to 1200° C. and, more desirably from 1050 to 1200° C.

A higher finishing temperature in hot working is more preferred from the viewpoint of preventing edge cracking. When the temperature after the working is lower than 600° C., toughness is deteriorated. Therefore, the rolling end temperature is desirably set to 600° C. or higher in plate rolling, hot strip rolling for sheet products, and the like.

Since hot strip rolling generally entails high draft, applying directly the hot strip rolling to a slab (source blank) bonded by electronic beam welding as it is may induce rolling troubles such as disbanding, which is not preferable. Therefore, the interface surfaces for cladding regarding the core component and the face components are preferably pressure-bonded together by virtue of diffusion bonding owing to plate rolling or forging, prior to the hot strip rolling.

Figure 7A:
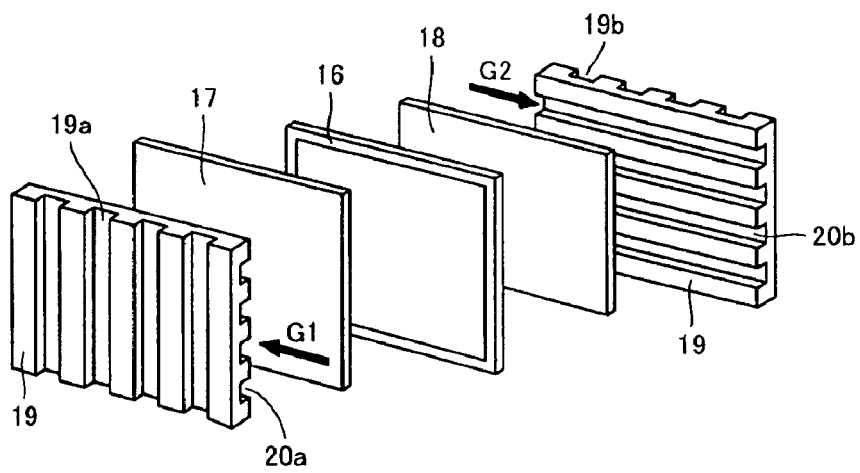
FIG. 7A is an exploded view of a cell for the fuel cell (unit cell)
Figure 7B:
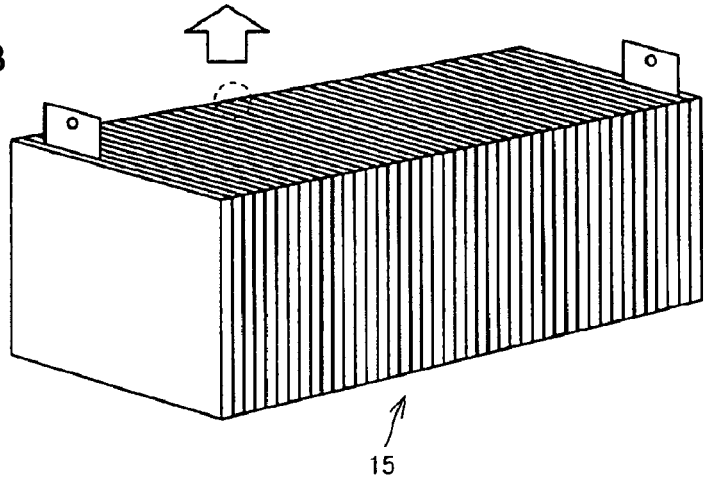
FIG. 7B is a perspective view of a fuel cell.

FIG. 7 show a structure of solid polymer type fuel cell, where FIG. 7A is an exploded view of a cell for fuel cell (unit cell), and FIG. 7B is a perspective view of a fuel cell. As shown in the same figures, a fuel cell 15 is an assembly of unit cells. The unit cell comprises a solid polymer electrolyte 16, a fuel electrode membrane (anode) 17 laminated on one surface thereof, a cathodic electrode membrane (cathode) 18 laminated on the other surface thereof, and separators 19a and 19b laminated on both outer sides of the membranes, as shown in the same figure A.

Fuel gas (hydrogen or hydrogen-containing gas) G1 is distributed through paths 20a provided in the separator 19a to supply hydrogen to the fuel electrode membrane 17. Oxidizing gas G2 such as the air is distributed through paths 20b provided in the separator 19b to supply oxygen. A direct current power is generated by an electro-chemical reaction caused by these gases supplied.

When the stainless steel three-ply clad sheet of the present invention is used as a fuel cell separator material as described above, the sheet is hot-worked and then subjected to cold strip rolling as cold working for a cold rolled sheet followed by finishing rolling, and a resulting thin sheet is formed into a predetermined sectional shape by press forming.

EXAMPLE 1

To confirm the effect of the present invention, the following test was carried out using a material containing 0.6% B with the balance being equivalent to SUS 316L as face components, a SUS 316L-equivalent material free from B as a core component, and a SUS 304L-equivalent material free from B as protectors and tabs. The chemical compositions of each stainless steel used are shown in Table 1.

TABLE 1

| | Chemical compositions (% by mass, the balance Fe and impurities) | | | | | | | | | |
|---|---|---|---|---|---|---|---|---|---|---|
| Component | C | Si | Mn | P | S | Cr | Mo | Ni | B | Steel type |
| Face component | 0.02 | 0.55 | 0.95 | 0.028 | 0.001 | 17.5 | 2.05 | 12.1 | 0.60 | B contained, the balance being equivalent to SUS 316L |
| Core component | 0.02 | 0.55 | 0.95 | 0.028 | 0.001 | 17.5 | 2.05 | 12.1 | — | Equivalent to SUS 316L, free from B |
| Protector, Tab | 0.02 | 0.35 | 1.23 | 0.031 | 0.002 | 18.25 | 0.01 | 8.12 | — | Equivalent to SUS 304L, free from B |

The dimension of each slab made of above stainless steel to be used for constructing the source blank is shown in Table 2.

shown in Table 1 and Table 2. The bonding of each component was performed by electron beam welding.

TABLE 2

Table 2

| Case No. | Class | Component | Dimension of slab (Thickness × Width × Length) |
| --- | --- | --- | --- |
| Case 1 | Inventive example | Face component | 60 mm × 1020 mm × 4660 mm |
|  |  | Core component | 140 mm × 1085 mm × 4665 mm |
|  |  | Protector | 60 mm × 30 mm × 4860 mm |
| Case 2 | Inventive example | Face component | 60 mm × 1020 mm × 3550 mm |
|  |  | Core component | 140 mm × 1090 mm × 3560 mm |
|  |  | Protector | 60 mm × 30 mm × 3750 mm |
| Case 3 | Inventive example | Face component | 60 mm × 1020 mm × 4700 mm |
|  |  | Core component | 140 mm × 1020 mm × 4705 mm |
|  |  | Protector | 255 mm × 30 mm × 4905 mm |
| Case 4 | Comparative example | Face component | 60 mm × 1020 mm × 4700 mm |
|  |  | Core component | 140 mm × 1020 mm × 4705 mm |
|  |  | Protector | — |
| Case 5 | Comparative example | Not clad component | 140 mm × 1020 mm × 4705 mm |
|  |  | Core component | — |
|  |  | Protector | 140 mm × 30 mm × 4905 mm |

Note:
The thickness of the face component shows the one for each of the two.

Figure 8A:
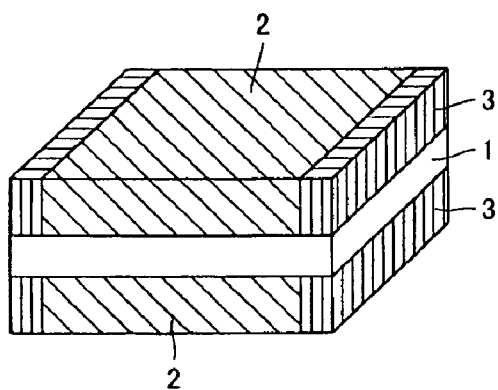
FIG. 8A shows the structure of an inventive example according to the fourth invention and the fifth invention.
Figure 8B:
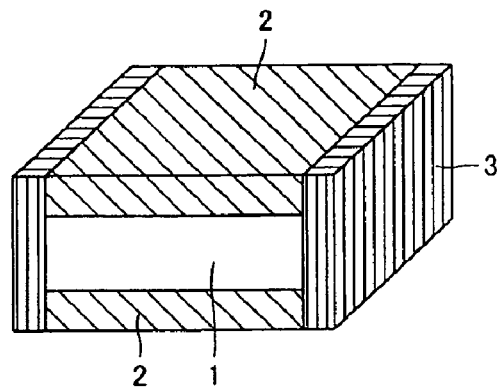
FIG. 8B shows the structure of an inventive example according to the sixth invention.

FIG. 8 are views showing structures of the source blanks for a stainless steel three-ply clad sheet used in Examples, where FIG. 8A shows the structure of an inventive example according to the fourth invention and the fifth invention, and FIG. 8B shows the structure of an inventive example of the sixth invention.

In Case 1 and Case 2 that are tests for the inventive examples shown in the same figure A, protectors 3 with a thickness covering only the thickness of a face component 2 shown in Table 2 are bonded to side end surfaces of each face component 2, respectively, by electron beam welding.

As shown in Table 2, the width and length of the core component are larger than the total width of that of the face components and that of the protectors and than the length of the face components by 2.5 mm per each at all four side ends other than working planes in Case 1, and by 5 mm per each at all four side ends other than working planes in Case 2.

In Case 3 that is the test for the inventive example shown in the same figure B, two face components 2 with a thickness of 60 mm are piled on both upper and lower surfaces of a core component 1 with a thickness of 140 mm, respectively, and protectors 3 with a thickness substantially covering the whole thickness of the piled block are bonded to side end surfaces, other than working planes, of the piled block by electron beam welding. An allowable difference in thickness between the piled block and the protectors 3 is about ±10 mm, and the thickness of the protectors is smaller by 5 mm in the example of Table 2.

In Case 4 that is the test for a comparative example, a source blank for clad steel sheet was produced by using slabs of the same width and length for each of the face components and the core component, respectively, without protectors.

In Case 5 that is the test for another comparative example, not a source blank for clad steel sheet but a source blank for steel sheet was produced by bonding protectors to opposite side end surfaces of one slab of a B-containing SUS 316L-equivalent material.

In Case 1 and Case 2, source blanks for a stainless steel three-ply clad were produced through the steps shown in Steps 1 to 5 of the fourth invention using each component In Step 1, each of the surfaces of the face component to be abutted on the protectors was abrasively machined by a milling machine so as to have a flatness of ±1 mm or less.

In Step 2, the protectors were bonded with the tabs and with the face component at respective boundary regions, starting at the boundary regions between the tabs and the protectors, by main welding and cosmetic welding, both being vertical welding, under conditions shown in Table 3.

In Step 3, a bonded composite 7 of the face component and protectors was obtained by cutting and removing the tabs and the extended portions of the protectors bonded with the tabs.

In Step 4, each of the surfaces of the core component to be clad with the face components was abrasively machined by a milling machine so as to have a flatness of ±1 mm or less.

In Step 5, bonding of the boundary regions between the face components and the core component and the boundary regions between the protectors and the core component in the combined block obtained in Step 4 was performed by main welding and cosmetic welding, both being horizontal welding, under conditions shown in Table 3.

In the test of Case 3, a source blank for a stainless steel three-ply clad sheet was produced through the steps shown by Steps 1 to 7 of the sixth invention. Bonding of each component was performed by electron beam welding. Further, each surface of the face components to be clad with the core component was abrasively machined by milling so as to have a flatness of ±1 mm or less.

In Step 3, the bonding was carried out by main welding and cosmetic welding in vertical direction in conditions shown in Table 3, starting at the boundary regions between the tabs and the protectors. In Step 6, the bonding on side end surfaces having no protector disposed thereon, in the bonded composite of the core component and face components having the tabs disposed thereon, which was obtained in Step 5, was carried out by main, horizontal welding.

Table 3 shows electron beam welding conditions such as welding current value and welding speed for the main welding and cosmetic welding, both being vertical welding, and for the main welding and cosmetic welding, both being horizontal welding, respectively.

TABLE 3

Table 3

| Welding alignment, Main welding/Cosmetic welding | Welding current value (mA) | Welding speed (mm/min) |
|---|---|---|
| Main welding, vertical welding | 350 | 100 |
| Cosmetic welding, vertical welding | 250 | 200 |
| Main welding, horizontal welding | 300 | 500 |
| Cosmetic welding, horizontal welding | 150 | 400 |

Table 4 shows the depth of bead concave (A) and the penetration depth of bead (B) on a cross section of weld bead.

TABLE 4

Table 4

| Case No. | Each dimension of weld section (mm) | After main welding | After cosmetic welding |
|---|---|---|---|
| Case 1 | A | 7 | 2 |
|  | B | 62 | 62 |
| Case 2 | A | 7 | 2 |
|  | B | 60 | 60 |
| Case 3 | A | 7 | 2 |
|  | B | 62 | 62 |
| Case 4 | A | — | — |
|  | B | — | — |

Note:
No value for A and B is given in Case 4 since the protectors are not used and no vertical welding is needed.
Irrelevant for Case 5 since it is not a clad sheet test.

In each of Cases 1, 2 and 3, the desirable ranges specified by the tenth invention, that is, $A \leqq 5$ mm and $B \geqq 15$ mm are satisfied, with the value of A of 7 mm after main welding or 2 mm after cosmetic welding and the value of B of 60 to 62 mm as shown in the same Table.

In Case 4, no vertical welding is needed since the source blank for clad steel sheet was produced without protectors, and the values of A and B are thus nonexistent.

Table 5 shows evaluation results for horizontal welding of the source blanks for a stainless steel three-ply clad sheet produced as described above.

TABLE 5

Table 5

| Case No. | Weld bead appearance | Evaluation |
|---|---|---|
| Case 1 | Weld metal dropping is hardly observed. | ○ |
| Case 2 | Less weld metal dropping is observed. | Δ |
| Case 3 | Weld metal dropping is hardly observed (evaluation for front and rear end surfaces). | ○ |
| Case 4 | Weld metal dropping almost continuously occur. | × |

Note:
○: Good weld bead appearance almost without weld metal dropping
Δ: Weld metal dropping occurred but not continuously, with few points of occurrence.
×: Weld metal dropping almost continuously occurred.

In the evaluation column of the same Table, ○ shows that good weld bead appearance was observed almost without weld metal dropping by electron beam welding, Δ shows that weld metal dropping occurred but not continuously, with few points of occurrence, and × shows that weld metal dropping almost continuously occurred.

The tests of Cases 1 and 2 pertain to inventive examples which perfectly satisfy the conditions specified by the first, second, fourth, fifth and seventh to tenth inventions. The test of Case 3 pertains to an inventive example which perfectly satisfies the conditions specified by the first, second and sixth to tenth inventions, and further satisfies the condition specified by the fifth invention with respect to the front/rear end surface dimension of the source blank for clad steel sheet. The test of Case 4 pertains to a comparative example which does not meet the requirements such as disposition of the protectors, bonding of the protectors with the face components, partial removal of the protectors, bonding of the protectors with the core component, and the like in Steps 1 to 5 specified by the fourth invention, since the protectors are not used.

In Cases 1 and 3, source blanks for clad steel sheet having good weld bead appearance could be obtained with hardly causing weld metal dropping at front and rear end surfaces with locations as few as one or less per each end surface.

In Case 2, weld metal dropping occurred, but the locations thereof are as few as 3 to 5 points per each end surface, and a source blank for clad steel sheet could be thus obtained through some repairs such as partial cosmetic welding and grinding for only the locations of weld metal dropping.

In Case 4, since weld metal dropping almost continuously occurred at weldments, repairs for filling back depressed portions formed by weld metal dropping by cosmetic welding and removing portions of weld metal dropping by use of a grinder were carried out over the whole weldment circumference of the source blank for steel sheet.

The resulting source blanks for a stainless steel three-ply clad sheet were heated to 1180° C. and bloom-rolled to a thickness of 147 mm to thereby produce slabs for hot rolling. At that time, in Case 4 where no protector was used, since edge cracking occurred at edge portions, and this was likely to induce troubles such as rupture of in-processing workpiece in the subsequent hot rolling process, so the test was stopped in this stage.

The source blanks in Cases 1, 2 and 3 were then subjected to slab conditioning and hot rolling, and finished into hot rolled coils with a final wall thickness of 6 mm by finishing the rolling at 1000° C.

As a result, in Case 1 that is the test for the inventive example satisfying all of the conditions specified by the first, second, fourth, fifth and seventh to tenth inventions, the resulting steel sheet had satisfactory properties despite slight fine cracking at an outermost edge portion.

In Case 2 where the size of the core component was larger than the total width and/or length of the face components and the protectors by 5 mm, compared with Case 1 where the size is larger by 2.5 mm, fine cracks were observed at edge portions after completion of hot rolling. Since cold rolling in as-is condition might induce troubles such as rupture of in-processing workpiece originating from such cracks, the fine cracks were removed by hot trimming, and then followed by cold rolling.

In Case 3, further, a satisfactory result without edge cracking was obtained at sheet steel edges after hot rolling.

The hot coils were subjected to treatments such as annealing and acid washing, after slight conditioning for fine cracking in Case 1, after hot trimming in Case 2, and as it is without conditioning in Case 3, and further cold rolled into a finished wall thickness of 0.15 mm. As a result, cold rolled steel sheets with a thickness of 0.15 mm that are separator materials could be obtained without edge cracking during cold rolling.

In the tests of Cases 1, 2 and 3, troubles such as disbonding of clad surface and swelling defects were never caused in these steps since the flatness of the cladding interface between the core component and the face components was controlled to 1 mm or less by machining.

In Case 4 that is the test for the comparative example, in contrast, no steel sheet for separator could be obtained since execution of the following hot rolling and cold rolling became difficult due to the edge cracking during bloom rolling as described above.

As described so far, according to the method for producing a source blank for a stainless steel three-ply clad sheet, the source blank for steel sheet, and the method for producing a steel sheet of the present invention, an ultra thin stainless steel separator which had been difficult to produce in the past can be produced. Particularly, in Case 1 where the size of the core component is larger than the total width and/or length of the face components and the protectors within the range of 0.5 mm or more and less than 5 mm per each side end, an ultra thin cold-rolled steel sheet could be obtained with high production efficiency. The same effect can be obtained even when the width and/or length of the core component is set smaller than the total width and/or length of the face components and the protectors.

In the test of Case 3 that pertains to the inventive example of the sixth invention, an ultra thin cold-rolled steel sheet can be obtained with the highest production efficiency and high yield since not only the step of edge trimming but also the conditioning for fine cracking can be omitted because of the absence of edge cracking.

In Case 4 where the protectors were bonded to both side end surfaces of a single body of slab containing B, a cold rolled steel sheet with a thickness of 0.15 mm was produced by applying the steps of performing slab conditioning after casting, followed by electron beam welding of the protectors, and reducing the thickness to 85 mm by hot forging, and further followed by hot rolling and cold rolling. Since this steel sheet is not a clad steel sheet, the production thereof needs no consideration for bead drop related to the assembling work of the source blank for steel sheet or the like, and has no edge cracking in hot coil stage, the problems in production were a few, compared with in the production of the clad steel sheet.

EXAMPLE 2

Further, evaluation test for press formability was carried out using cold-rolled steel sheets obtained by the tests of Example 1 as a test block.

Elongation values calculated by the left-hand side of Equation (1) and results of the evaluation test for press formability are summarized in Table 6.

TABLE 6

| Table 6 | | | | |
|---|---|---|---|---|
| | | Value of left-hand side | Groove pitch | |
| Case No. | Class | of Equation (1) (%) | 3 mm | 2 mm |
| Case 1 | Inventive example | 44.9 | ○ | ○ |
| Case 2 | Inventive example | 44.9 | ○ | ○ |
| Case 3 | Inventive example | 44.9 | ○ | ○ |
| Case 4 | Comparative example | 44.9 | — | — |
| Case 5 | Comparative example | 32.0 | × | × |

In Cases 1 and 2 which are inventive examples of the fourth invention and Case 3 that is an inventive example of the sixth invention, the wall thickness of the core component is 2.3 times that of one face component, and the measured values of elongation of the resulting stainless steel three-ply clad sheets were also satisfactory with 46%. The elongation value of the stainless steel three-ply clad sheet calculated by the left-hand side of Equation (1) or Equation (2) is 45%, as shown in Table 6, with 32% elongation value ($\epsilon_1$) of the face component and 56% elongation value ($\epsilon_0$) of the core component. In Cases 1, 2 and 3 of the inventive examples, therefore, the measured value of elongation is substantially matched with the calculated value of elongation.

In the evaluation test, each test block was pressed by a press machine of $4.9 \times 10^5$ N (50 tf) using a press die for separator production having a flow path part of 50 mm×50 mm. The die had a groove width forming a gas flow path of 2 mm, a groove depth of 0.8 mm, and a pitch between the grooves of 2 mm or 3 mm.

In the result of the evaluation test shown in the same Table, no occurrence and occurrence of penetrated crack at a pitch between the grooves in each test block are shown by ○ and ×, respectively.

It was found from the result of the evaluation test that Cases 1, 2 and 3, which are tests for inventive examples and satisfy that the value of the left-hand side of Equation (1) is 40%, or the condition specified by the eleventh invention show satisfactory press formability, compared with Case 5 that is a test for a comparative example. The evaluation test could not be carried out for Case 4 since cracking in bloom rolling occurred before advancing to cold rolling as described above.

A cell for solid polymer type fuel cell (unit cell) shown in FIG. 4 was produced using a separator obtained by press forming each resulting cold-rolled steel sheet, and evaluated for battery performance. The result is shown in Table 7.

TABLE 7

| Table 7 | | |
|---|---|---|
| Case No. | Class | Decreasing rate of unit cell voltage |
| Case 1 | Inventive example | <0.02 |
| Case 2 | Inventive example | <0.02 |
| Case 3 | Inventive example | <0.02 |
| Case 4 | Comparative example | — |
| Case 5 | Comparative example | — |

Note:
The evaluation test could not be carried out for Case 4 since cracking occurred in bloom rolling before advancing to cold rolling.
The evaluation test could not be carried out for Case 5 since cracking occurred in the formability test.

Hydrogen gas having a purity of 99.9999% was used as anode electrode-side fuel gas, and the air was used as cathode electrode-side gas. The internal pressure of the cell was controlled to $1.013 \times 10^5$ Pa by controlling the humidity within the cell at the cell inlet side while retaining the cell body at $(78\pm2)°$ C.

Evaluation for the state of generation of electric power was continuously performed from the state with 0.5 A/cm² and 0.62 V by unit cell. The cell performance was comparatively evaluated by the value of [1−(cell voltage after 50 hrs/initial cell voltage)] as decreasing rate of unit cell voltage after the lapse of 50 hours.

It is found from the evaluation result shown in Table 7 that the three-ply clad steel sheets of Cases 1, 2 and 3 have a small decreasing rate of voltage. This decreasing rate of voltage is a value almost equal to the decreasing rate of voltage of a steel sheet composed of a single layer of the face component.

INDUSTRIAL APPLICABILITY

According to the method for producing a stainless steel three-ply clad sheet of the present invention, a B-containing stainless steel clad sheet which is mass-producible at low costs with excellent hot workability and formability, and most suitable as a separator for a solid polymer type fuel cell can be produced. A separator and a solid polymer type fuel cell with excellent cell performances can be produced by using the stainless steel clad sheet of the present invention. Consequently, the present invention can be extensively applied as techniques for producing a separator steel sheet, a separator and further a cell in the field of fuel cell production.

The invention claimed is:

1. A method for producing a source blank for a stainless steel three-ply clad sheet, comprising producing a source blank for a clad steel sheet composed of a stainless steel having a B content of 0 to 0.3% by mass as a core component and a stainless steel having a B content of 0.3 to 2.5% by mass as face components, the face components each being combined with each of major faces of the core component through steps shown by the following Steps 1 to 5:

Step 1: disposing, on side end surfaces, other than a working plane, of the face component, protectors with a length greater than the length of the side end surfaces of the face component, and disposing tabs each in abutting relation with an extension of the protector's face to abut on the side end face of the face component, where the extension is an extra length portion exceeding the length of the side end face of the face component;

Step 2: performing bonding at boundary regions between the tabs and the protectors disposed in Step 1 and between the face component and the protectors in such a manner that the boundary region between the tab and the protector becomes a starting point of the bonding;

Step 3: removing the tabs and extended portions of the protectors bonded with the tabs to thereby obtain a bonded composite of the face component and protectors;

Step 4: piling the bonded composites of the face component and protectors produced in Step 3 on the core component so that each relevant face of the core component to be clad contacts with the relevant face of the face components in cladding relation therewith to thereby obtain a combined block; and Step 5: performing, in the combined block obtained in Step 4, bonding at boundary regions between the face components and the core component and between the protectors and the core component at respective boundary regions to thereby obtain the source blank for a stainless steel three-ply clad sheet.

2. A method for producing a source blank for a stainless steel three-ply clad sheet, comprising producing a source blank for clad steel sheet composed of a stainless steel having a B content of 0 to 0.3% by mass as a core component and a stainless steel having a B content of 0.3 to 2.5% by mass as face components, the face components each being combined each of major faces of the core component through steps shown by the following Steps 1 to 7:

Step 1: piling the face components on the core component so that each relevant face of the core component to be clad contacts with the relevant face of the face components in cladding relation therewith to thereby obtain a piled block;

Step 2: disposing, on side end faces, other than a working plane, of the piled block obtained in Step 1, protectors with a length covering the total thickness of the piled block, and a length greater than the length of the side end faces of the piled block, and disposing tabs each in abutting relation with an extension of the protector's face to abut on the side end face of the piled block, where the extension is an extra length portion exceeding the length of the side end faces on two face of the piled block;

Step 3: performing bonding at boundary regions between the tabs and the protectors disposed in Step 2 and between the face components and the protectors, in such a manner that the boundary regions between the tab and the protector becomes a starting point of the bonding;

Step 4: removing the tabs and extended portions of the protectors bonded with the tabs to thereby obtain a bonded composite of the core component, face components and protectors;

Step 5: disposing tabs at end portions of the boundary regions between the face components and the protectors onto the working plane of the bonded composite of the core component, face components and protectors produced in Step 4 so that one of faces of each tab forms the same plane with the side end face on which no protector is disposed in Step 2;

Step 6: performing, in the bonded composite of the core component, face components and protectors, after having the tabs disposed thereon in Step 5, bonding at the boundary regions between the face components and the core component on the side end faces on which no protector is disposed, in such a manner that the protector becomes a starting point of the bonding, and further bonding at the boundary regions between the face components and the protectors and at the boundary regions between the core component and the protectors on the side end faces in such a manner that the tab becomes a starting point of the bonding; and Step 7: removing the tabs to thereby obtain the source blank for the stainless steel three-ply clad sheet.

3. A method for producing a stainless steel three-ply clad plate for a solid polymer type fuel cell separator, comprising:

heating a source blank for the stainless steel three-ply clad sheet to a temperature of 1000 to 1200° C., the source blank comprising one of the source blank produced by the method of claim 1 or a source blank composed of:
a stainless steel having a B content of 0 to 0.3% by mass as a core component;
a stainless steel having a B content of 0.3 to 2.5% by mass as face components, the face components each being combined with each of major faces of the core component; and
protectors disposed on each of side end surfaces other than a working plane of the face component; and then performing hot pre-working with a working finishing temperature of 600° C. or higher thereto.

4. A stainless steel three-ply clad plate for a solid polymer type fuel cell separator, which is produced by the method according to claim 3.

5. A method for producing a stainless steel three-ply clad sheet for a solid polymer type fuel cell separator, comprising:

heating a source blank for the stainless steel three-ply clad sheet to a temperature of 1000 to 1200° C., the source blank comprising one of the source blank produced by the method of claim 4 or a source blank composed of:
a stainless steel having a B content of 0 to 0.3% by mass as a core component;
a stainless steel having a B content of 0.3 to 2.5% by mass as face components, the face components each being combined with each of major faces of the core component; and
protectors disposed on each of side end surfaces other than a working plane of the face component; and then performing rough rolling, hot rolling with a rolling finishing temperature of 600° C. or higher, and cold rolling thereto.

6. A method for producing a stainless steel three-ply clad sheet for a solid polymer type fuel cell separator, comprising:
further heating the stainless steel three-ply clad plate according to claim 4 to a temperature of 1000 to 1200° C.; and
then performing rough rolling, hot rolling with a rolling finishing temperature of 600° C. or higher, and cold rolling thereto.

7. A solid polymer type fuel cell separator, using a stainless steel three-ply clad sheet produced by the method according to claim 5.

8. A solid polymer fuel cell, using the solid polymer type fuel cell separator according to claim 7.

* * * * *

UNITED STATES PATENT AND TRADEMARK OFFICE
CERTIFICATE OF CORRECTION

PATENT NO. : 8,100,313 B2  
APPLICATION NO. : 12/076197  
DATED : January 24, 2012  
INVENTOR(S) : Kanbe et al.

Page 1 of 1

It is certified that error appears in the above-identified patent and that said Letters Patent is hereby corrected as shown below:

Column 26, line 56:
"the method of claim 4 or a source blank composed of:" should read:
"the method of claim 1 or a source blank composed of"

Signed and Sealed this
Tenth Day of July, 2012

David J. Kappos
*Director of the United States Patent and Trademark Office*